June 2, 1925.   J. P. HERRICK   1,540,694
TONGS
Filed Jan. 7, 1925
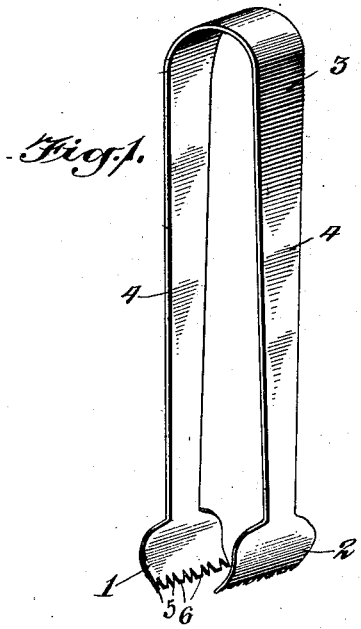
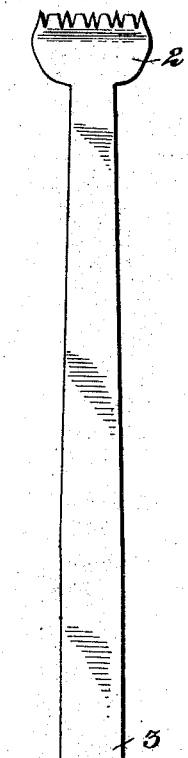
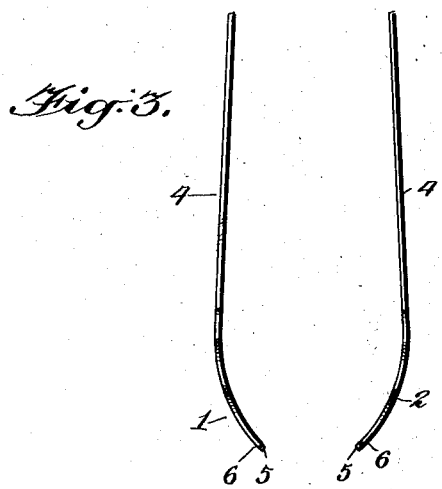
WITNESSES
INVENTOR
Josephine P. Herrick
BY
ATTORNEYS Patented June 2, 1925.

1,540,694

UNITED STATES PATENT OFFICE.

JOSEPHINE POMEROY HERRICK, OF CLEVELAND, OHIO.

TONGS.

Application filed January 7, 1925. Serial No. 1,069.

*To all whom it may concern:*

Be it known that I, JOSEPHINE P. HERRICK, a citizen of the United States, and a resident of Cleveland, in the county of Cuyahoga and State of Ohio, have invented a new and Improved Tongs, of which the following is a full, clear, and exact description.

This invention relates to tongs and more particularly to a gripping device having an improved arrangement of sharp and dull teeth whereby an effective gripping action may be had without danger of the sharp teeth projecting through the food or other article with which the device is engaged.

I shall hereinafter describe my invention as a device primarily adapted for handling meat and the like especially during the cooking operation as, for example, in the handling of bacon, ham and the like.

It is to be understood, however, that the invention has a wider range of utility than that referred to as it is obvious that the same general construction and principle involved may be employed in connection with a wide range of usefulness, and hence I desire to cover the invention broadly without limiting myself to any particular use but reserve unto myself the right to protect in the patent the idea or the construction for any use to which it can be put. Hence, it is needless to set forth in detail the many uses to which the article may be put.

With these and other objects in view, the invention consists in certain novel features of construction and combinations and arrangements of parts which will be more fully hereinafter described and pointed out in the claim.

In the accompanying drawings—

Figure 1 is a perspective view illustrating one embodiment of my invention;

Figure 2 is a plan view of the blank from which the device shown in Figure 1 is made;

Figure 3 is a fragmentary edge view of the two legs of the tongs at their gripping ends.

My invention relates more specifically to the construction and arrangement of a pair of gripping jaws 1 and 2, and while I have shown these jaws 1 and 2 as integral parts of a spring metal strip 3, bent between its ends to form a pair of legs or arms 4, it is obvious that the gripping jaws 1 and 2 may be otherwise mounted so as to enable them to be moved toward and away from each other under the control of the operator.

The jaws 1 and 2 are preferably curved slightly longitudinally of their length so that they converge toward each other at their free edges, as clearly indicated in Figure 3. The jaws 1 and 2 are as wide as desired and at their free edges are provided with sharp and dull teeth 5 and 6, respectively.

A preferable arrangement is that shown in which the sharp teeth are alternate with the dull teeth and are preferably a trifle longer than the dull teeth.

The reason for constructing the jaws with this arrangement of sharp and dull teeth is to enable the jaws to grip an article, the sharp teeth projecting into the article but slightly and prevented from over puncture by reason of the dull teeth which limit the inwardly projecting movement of the sharp teeth.

Such an arrangement is extremely desirable in many instances. One instance will suffice to explain. In handling bacon while frying it is necessary to reverse the bacon and to remove the same, and, as bacon is ordinarily cut rather thin and becomes fragile during the frying operation so that if it is gripped by any device which will project through the bacon, the latter will be broken and will be rendered difficult to handle.

With my improved device the dull teeth limit the projecting action of the sharp teeth and enable the bacon to be handled with perfect freedom and without danger of breaking the same.

Furthermore, by reason of the sharp and dull teeth the device will readily release the object and hence such a tongs will necessarily serve many useful purposes.

It is, therefore, the broad idea of a gripping device in which the members have sharp and dull teeth which constitutes the broad idea of my invention, and I desire to cover this idea for any use to which it can be put.

Various slight changes and alterations might be made in the general form of the parts described without departing from my invention, and hence I do not limit myself to the precise details set forth but consider myself at liberty to make such slight changes and alterations as fairly fall within the spirit and scope of the appended claim.

I claim:

A device of the character described, comprising a pair of connected spring arms, jaws at the ends of the arms, said jaws at their ends having inwardly projecting teeth, each jaw having alternate sharp and dull teeth, some of the sharp teeth projecting slightly beyond the dull teeth, and the dull teeth functioning to limit the projection of the sharp teeth into the article with which the jaws are in engagement.

(Mrs.) JOSEPHINE POMEROY HERRICK.